United States Patent
O'Connell et al.

(10) Patent No.: US 11,205,102 B1
(45) Date of Patent: Dec. 21, 2021

(54) TAMPER PROOF LOGGING FOR AUTOMATED PROCESSES

(71) Applicant: EMC IP Holding Company LLC, Hopkinton, MA (US)

(72) Inventors: Mark A. O'Connell, Westborough, MA (US); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1250 days.

(21) Appl. No.: 15/496,492

(22) Filed: Apr. 25, 2017

(51) Int. Cl.
*G06K 9/62* (2006.01)
*G06N 20/00* (2019.01)
*G06F 9/30* (2018.01)

(52) U.S. Cl.
CPC .......... *G06K 9/6264* (2013.01); *G06N 20/00* (2019.01); *G06F 9/30058* (2013.01)

(58) Field of Classification Search
CPC ... G06K 9/6264; G06N 20/00; G06F 9/30058
USPC .......................................................... 706/13
See application file for complete search history.

(56) References Cited

U.S. PATENT DOCUMENTS

| | | | | |
|---|---|---|---|---|
| 7,343,306 B1* | 3/2008 | Bates | ...................... | G06Q 40/08 701/32.4 |
| 10,057,293 B2* | 8/2018 | Aamir | ...................... | H04L 63/06 |
| 2002/0194209 A1* | 12/2002 | Bolosky | ................. | G06F 16/137 |
| 2009/0055443 A1* | 2/2009 | Miyamoto | ............ | G06F 16/958 |
| 2015/0046742 A1* | 2/2015 | Hata | ................... | G06F 11/3604 713/502 |
| 2017/0103200 A1* | 4/2017 | Uehara | .................... | G06F 21/52 |
| 2018/0020087 A1* | 1/2018 | Shi | .......................... | H04W 4/21 |
| 2018/0287797 A1* | 10/2018 | Banerjee | .................. | H04L 9/32 |

OTHER PUBLICATIONS

Rodger, et al., "Toward reducing failure risk in an integrated vehicle helath maintenance system: A fuzzy multi-sensor data fusion Kalman filter approach for IVHMS", Expert System with Applications 39 (2012) 9821-9836 (Year: 2012).*
Wikipedia, "Blockchain," https://en.wikipedia.org/wiki/Blockchain, Apr. 18, 2017, 29 pages.
Wikipedia, "Content-Addressable Memory," https://en.wikipedia.org/wiki/Content-addressable_memory, Apr. 9, 2017, 7 pages.
Wikipedia, "Cryptographic Hash Function," https://en.wikipedia.org/wiki/Cryptographic_hash_function, Apr. 9, 2017, 16 pages.
Wikipedia, "Secure Hash Algorithms," https://en.wikipedia.orgwiki/Secure_Hash_Algorithms, Apr. 15, 2017, 2 pages.

* cited by examiner

*Primary Examiner* — Tsu-Chang Lee
(74) *Attorney, Agent, or Firm* — Ryan, Mason & Lewis, LLP

(57) ABSTRACT

A manifest for an automated system is generated, wherein the manifest comprises a record of a plurality of algorithms configured to be used in operation of the automated system. An operational audit branch is generated from the manifest in response to execution of one or more algorithms of the plurality of algorithms. The generation of the operational audit branch comprises recording one or more inputs used by the one or more algorithms, and recording one or more outputs generated by the one or more algorithms.

19 Claims, 7 Drawing Sheets

Manifest CA: iksj88dj30d 202-1 — Vendor: Toyota
    Algorithm1 CA: sdf7c82jd — 204-1
    Algorithm2 CA: 8af7d7df — 204-2
    <Metadata>...... </Metadata> — 206-1
        Signature: a8asdf7d8d — 208-1

202-2 — Vendor: GE
    Algorithm3 CA: pkj3d88cj — 204-3
    Algorithm4 CA: 3kdic99d0 — 204-4
    <Metadata>...... </Metadata> — 206-2
        Signature: 33kdkd9s — 208-2

202-3 — Vendor: Airbiquity
    Algorithm5 CA: asd998sfd3 — 204-5
    <Metadata>...... </Metadata> — 206-3
        Signature: 9dd97dd83 — 208-3

210 — | TS = t0 | Prev | — 212

600

TAMPER PROOF LOGGING FOR AUTOMATED PROCESSES

FIELD

The field relates generally to management of automated systems and processes, and more particularly to the generation of operation logs for such automated systems and processes.

BACKGROUND

As a growing number of systems and processes become automated, the use of automated decision making systems is increasing, which, in turn, increases a likelihood of associated errors made by such systems. The effects of such errors, for example, in systems involving transportation or health care, may be dangerous, or even lethal.

In certain situations, a creator and/or provider of an automated system is not directly controlling the automated system and a user of the automated system may not be held responsible for the behavior of the automated system. For example, riders in a self-driving vehicle, such as an automobile, may have little or no legal responsibility for the behavior of the automated system, and liability for system errors may be assessed against the vehicle manufacturer and/or developer of the automated system. In another example, although a physician using an automated medical system to analyze symptoms or scans may retain responsibility for a final patient diagnosis, the manufacturer and/or developer of the automated medical system is likely to be liable for errors in the automated system that lead to overlooked conditions and/or symptoms. In contrast, the pilot of an airplane on autopilot can bear at least part of the responsibility for the actions of the airplane, even while it is on autopilot.

As automated systems become increasingly prevalent and are relied on to make decisions with potentially life-altering consequences, in the event of a system error or unwanted result, there is a need for mechanisms that can be used to determine, for example, whether the system was behaving correctly, was being used or operated within proper limits, was properly configured, and/or whether other concurrently running systems caused the system to malfunction.

SUMMARY

Embodiments of the invention provide systems and methods for generating a tamper proof log to securely track the behavior of an automated system.

For example, in one embodiment, a method comprises the following steps. A manifest for an automated system is generated, wherein the manifest comprises a record of a plurality of algorithms configured to be used in operation of the automated system. An operational audit branch is generated from the manifest in response to execution of one or more algorithms of the plurality of algorithms. The generation of the operational audit branch comprises recording one or more inputs used by the one or more algorithms, and recording one or more outputs generated by the one or more algorithms.

Advantageously, illustrative embodiments provide, within the context of automated decision making systems, mechanisms for generating a tamper proof log which can register the behavior of a system for a certain set of inputs, environmental factors, configuration options, and software version/code. Given a system error or unwanted result from the operation of the system, a log, in accordance with an embodiment of the present invention, is used in connection with analyses of any error situations, and for the proper assignment of any liability to a manufacturer and/or provider of the automated system.

These and other features and advantages of the invention will become more readily apparent from the accompanying drawings and the following detailed description.

BRIEF DESCRIPTION OF THE DRAWINGS

FIG. 2 illustrates an original vendor manifest, according to an illustrative embodiment.

DETAILED DESCRIPTION

Figure 1:
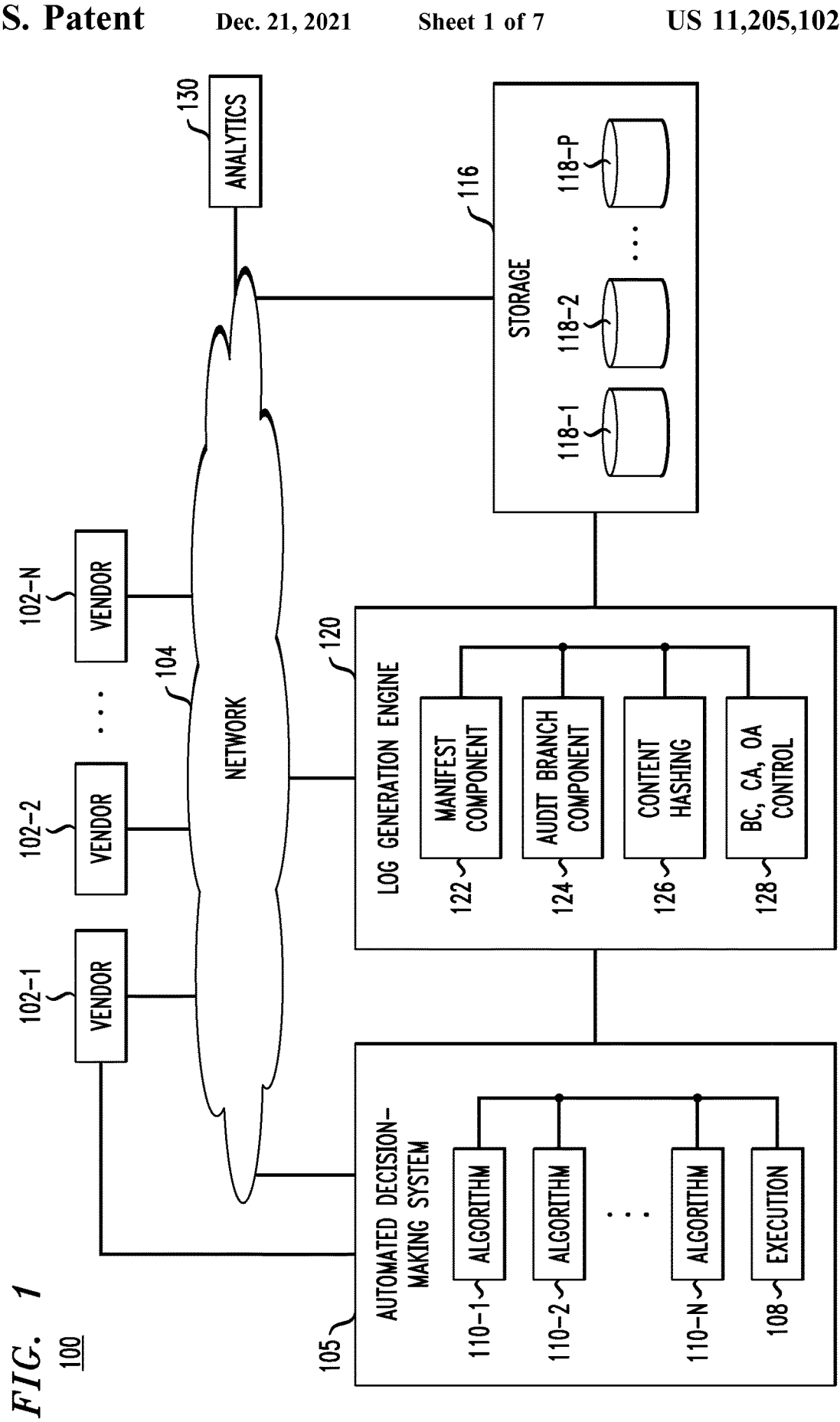
FIG. 1 illustrates a system for the generation of operational logs, according to an illustrative embodiment.

Embodiments of the present invention provide a mechanism to create a log of information which can be used to validate the correct behavior of an automated system or to assign liability in the case of a system malfunction. The log can include data corresponding to, but not necessarily limited to, inputs, outputs, algorithm execution, and environmental and/or configuration settings which may affect an algorithm. For embedded systems, such as vehicles using, for example, self-driving capabilities, the log can be configured to resist tampering, and be updateable with minimal latency and no assumption of network connectivity.

In accordance with an embodiment of the present invention, the log can be seeded based on information supplied by multiple parties who may be unlikely to cooperate to falsify a log, such as a manufacturer of the automated system (e.g., a software supplier and/or vehicle manufacturer), an owner of the system, and a trusted third party who is involved during the purchase (e.g., a motor vehicle registry and/or insurance company). As entries are added to the log, the entries can be signed with a cryptographic hash function (hash) based partially on the hash of a prior entry, or based on the seed if there is no prior entry. The entry can include a timestamp and/or a pseudo-random number from a trusted, external device that can be used to detect omissions from the log. A running hash of the per-entry signatures can be available from the system (also referred to herein as an "uber-hash"). In certain situations, this uber-hash can be periodically uploaded to an external trusted service, or be available for download if the system cannot be assumed to be network connected. For example, in the event of a vehicle accident, such as an automobile accident, law enforcement personnel on the scene could download the uber-hash to detect any log manipulation that may occur after the accident. The log can be applied to situations involving the behavior of an automated system in the context of a particular environment, configuration, and user, for identification of errors of faults in an algorithm or in usage of a device for liability purposes.

Illustrative embodiments of the present invention will be described herein with reference to exemplary logging systems and associated computers, storage devices and other types of processing devices of the systems. It is to be appreciated, however, that the invention is not restricted to use with the particular illustrative logging systems and processing device configurations shown.

As used herein, the terms "blockchain" and "digital ledger" may be used interchangeably. As is known, the blockchain or digital ledger protocol is implemented via a distributed, decentralized computer network of compute nodes. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction and a hash value of the previous block in the chain, i.e., the previous transaction. Thus, advantageously, each data block in the blockchain represents a given set of transaction data plus a set of all previous transaction data. In the case of a bitcoin implementation, a blockchain contains a record of all previous transactions that have occurred in the bitcoin network.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments of the invention are not limited to the above or any particular blockchain protocol implementation. As such, other appropriate cryptographic processes may be used to maintain and add to a secure chain of data blocks in accordance with embodiments of the invention.

It has been realized that as automated frameworks integrate multiple vendor algorithms into a working system (e.g., a self-driving car), there is often no provable method to determine which algorithms from which vendors are functioning in a system at a particular time, and whether the algorithms are functioning together in a system at the same time or at different times. Additionally, as automated frameworks download new algorithms to, for example, improve or and/or modify the function of the automated system, there is often no record of these updates or upgrades, making it difficult to conclusively prove whether the update/upgrade occurred, and to identify the source of the update/upgrade (e.g., a vendor). It has further been realized that as automated frameworks generate operational logs, there is often no way to conclusively prove that these logs have not been tampered with since the original log capture.

The buyer of an automated system (e.g., a driver) and the seller (e.g., a vehicle manufacturer) of the automated system (e.g., self-driving car) may partner with a variety of third parties that influence the purchase and operation of the system, such as, for example, a governmental registry of motor vehicles, insurers, and/or automobile repair shops. There are no current mechanisms for permanently recording the involvement of these third parties. Such information can be crucial for analyzing automated decisions that were made by software running in the system at a given time. Also, throughout the lifetime of an automated system, many of the algorithms from a given vendor may be completely removed or replaced when a user, for example, changes or no longer uses certain vendors. For example, a consumer may switch from Insurance Company A to Insurance Company B for lower rates based on a live driving analysis. There is no current mechanism to track the removal and/or replacement of such algorithms.

It has also been realized that certain automated frameworks that experience mobility to different geographic regions (e.g., self-driving vehicles) may function without network connectivity, such as, for example, to edge servers and/or cloud computing. As a result, the operational state of the unconnected systems and their functions may not be reported for extended periods of time.

Accordingly, to address the above-mentioned and other issues, illustrative embodiments provide a mechanism for seeding a tamper-proof log of the operations of an automated system so that parties, including, but not necessarily limited to, a manufacturer of the system, and an owner of the system may not modify the log in an undetectable manner. Once seeded, the tamper-proof log of operations descended from this seed can be continually maintained by the system.

While illustrative embodiments are described herein in the context of a self-driving vehicle, embodiments of the invention are not limited thereto and are applicable to other automated systems that are configured to perform autonomous automatic decision making and that may or may not be part of an embedded system.

FIG. 1 illustrates a system 100 for the generation of operational logs in an illustrative embodiment. As shown, the system 100 comprises a plurality of vendors 102-1, 102-2, . . . 102-N, collectively referred to herein as vendors 102, and an automated decision-making system 105 coupled to a network 104. The vendors 102, however, can also be locally linked to the automated decision making system 105 at one or more points in time, such as, upon manufacture of the automated decision making system 105 or when the automated decision making system 105 is upgraded or maintained at a vendor site. Also coupled to the network 104 is a log generation engine 120, a database storage component 116 and an analytics component 130.

Referring to FIG. 1, a plurality of algorithms 110-1, 110-2, . . . 110-N from the vendors 102 are configured to be used in operation of the automated decision-making system 105, such as, by way of example only, a self-driving automobile, or a medical diagnostic device. The automated decision-making system 105 may be an embedded system (i.e., integrated within an end product such as self-driving functionalities integrated into an automobile). A manifest component 122 of a log generation engine 120 locally connected to the automated decision-making system 105, or connected to the automated decision-making system 105 via network 104, generates a manifest for the automated system 105, wherein the manifest comprises a record of the plurality of algorithms 110-1, 110-2, . . . 110-N.

An audit branch component 124 of the log generation engine 120 generates an operational audit branch from the manifest in response to execution of one or more of the algorithms 110-1, 110-2, . . . 110-N by an execution component 108 of the automated decision-making system 105. Generation of the operational audit branch comprises recording, by the audit branch component 124, one or more inputs used by the one or more algorithms 110-1, 110-2, . . . 110-N, and recording by the audit branch component 124, one or more outputs generated by the one or more algorithms 110-1, 110-2, . . . 110-N. A content hashing component 126 of the log generation engine 120 is configured to generate hash values for the one or more algorithms 110-1, 110-2, . . . 110-N, and generate hash values for digitally signing manifests created by the manifest component 122.

Manifests and audit branches may be uploaded and stored in distinct storage volumes 118-1, 118-2, . . . 118-P of database storage component 116 as, for example, blockchain entries, or one or more immutable chains on content-addressable and/or object addressable systems. As noted herein, database storage component 116 may be local or network-based (e.g., cloud) storage. A user may use an analytics component 130 to query uploaded and stored manifests and operational audit branches in order to analyze the operation of the automated system 105.

The vendors 102 in some embodiments access the network through respective computing devices associated with their particular company, organization or other enterprise. The computing devices may include, for example, mobile telephones, laptop computers, tablet computers, desktop computers or other types of devices capable of supporting user access to network resources. Such devices are examples of what are more generally referred to herein as "processing devices."

Also, it is to be appreciated that the term "user" in this context and elsewhere herein is intended to be broadly construed so as to encompass, for example, human, hardware, software or firmware entities, as well as various combinations of such entities.

The network 104, in one or more embodiments, comprises a portion of a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

As explained herein, illustrative embodiments integrate blockchain, content-addressable and object-addressable functionalities into the storage of manifests and/or audit branches. For example, a blockchain (BC), content-addressable (CA) and object-addressable (OA) controller 128 can be integrated into the log generation engine 120 to enable storage of manifests and/or audit branches as blockchain entries or one or more immutable chains on content-addressable and/or object addressable systems.

FIG. 2 illustrates an original vendor manifest, according to an embodiment of the invention. Upon manufacturing of an automated system, such as a self-driving vehicle, a plurality of software packages available from multiple vendors may be initially installed into the vehicle. FIG. 2 illustrates a vendor manifest 200, which includes a record of vendors 202-1, 202-2 and 202-3, such as, for example, Toyota®, General Electric® (GE®) and Airbiquity®, listed along with respective software packages (referred to herein as "algorithms") Algorithm1, Algorithm2, Algorithm3, Algorithm4, and Algorithm5, provided by the corresponding vendors. In this embodiment, the manifest itself and each algorithm are respectively identified by a content address (CA). The CA is generated for each algorithm and the manifest by an associated hash (e.g., hash function SHA-256) which represents a unique fingerprint that identifies the algorithm or the manifest. The manifest 200 contains a list of these CAs (hash values) 204-1, 204-2, 204-3, 204-4 and 204-5. These hash values can also be referred to as digital signatures, or signatures of the algorithms. As an automated system is being manufactured, it can be initially configured with software algorithms that assist in its operation. In accordance with illustrative embodiments, a full list of algorithms that are initially installed during manufacturing can be preserved in a vendor manifest, such as manifest 200. This manifest becomes the "seed" for an auditable log of operations. This manifest can be timestamped (see FIG. 2, element 210). In this case, the timestamp (TS) is equal to t0 since the manifest 200 is an original manifest. The manifest can be stored (e.g., locally and/or in cloud storage) and protected using a hash value (e.g., based on SHA-256) to prevent tampering. A manifest can be encrypted using a hash function, and can also be digitally signed with a hash value.

Each vendor 202-1, 202-2 and 202-3 that produces an algorithm that is initially seeded into the manifest 200 can also digitally sign the algorithm using a private key that is only in the possession of the vendor that created (or bears responsibility/supports) the algorithm. By verifying the signature with its public key, auditors can confirm that a given algorithm was produced by a given vendor. These vendor signatures 208-1, 208-2 and 208-3 can also be part of the manifest 200.

While the manifest 200 includes algorithms from specific vendors, in addition, the manifest may indicate, where necessary, that a vendor of the device (e.g., Toyota in the case of a vehicle) manufactured the device, but did not directly create any of the automated algorithms running therein. The manifest 200 can also list metadata 206-1, 206-2 and 206-3, which may be associated with each algorithm (Algorithm1, Algorithm2, Algorithm3, Algorithm4, and Algorithm5).

Examples of metadata may include, but are not limited to, details associated with a given algorithm, e.g., date algorithm was created, installed, and/or updated, owner and/or creator identification data, algorithm operating parameters, etc. As can be seen by element 212 in FIG. 2, a manifest may also refer to a previous manifest if applicable. In the case of an original manifest, such as manifest 200, there is no previous manifest listed in the field.

Figure 3:
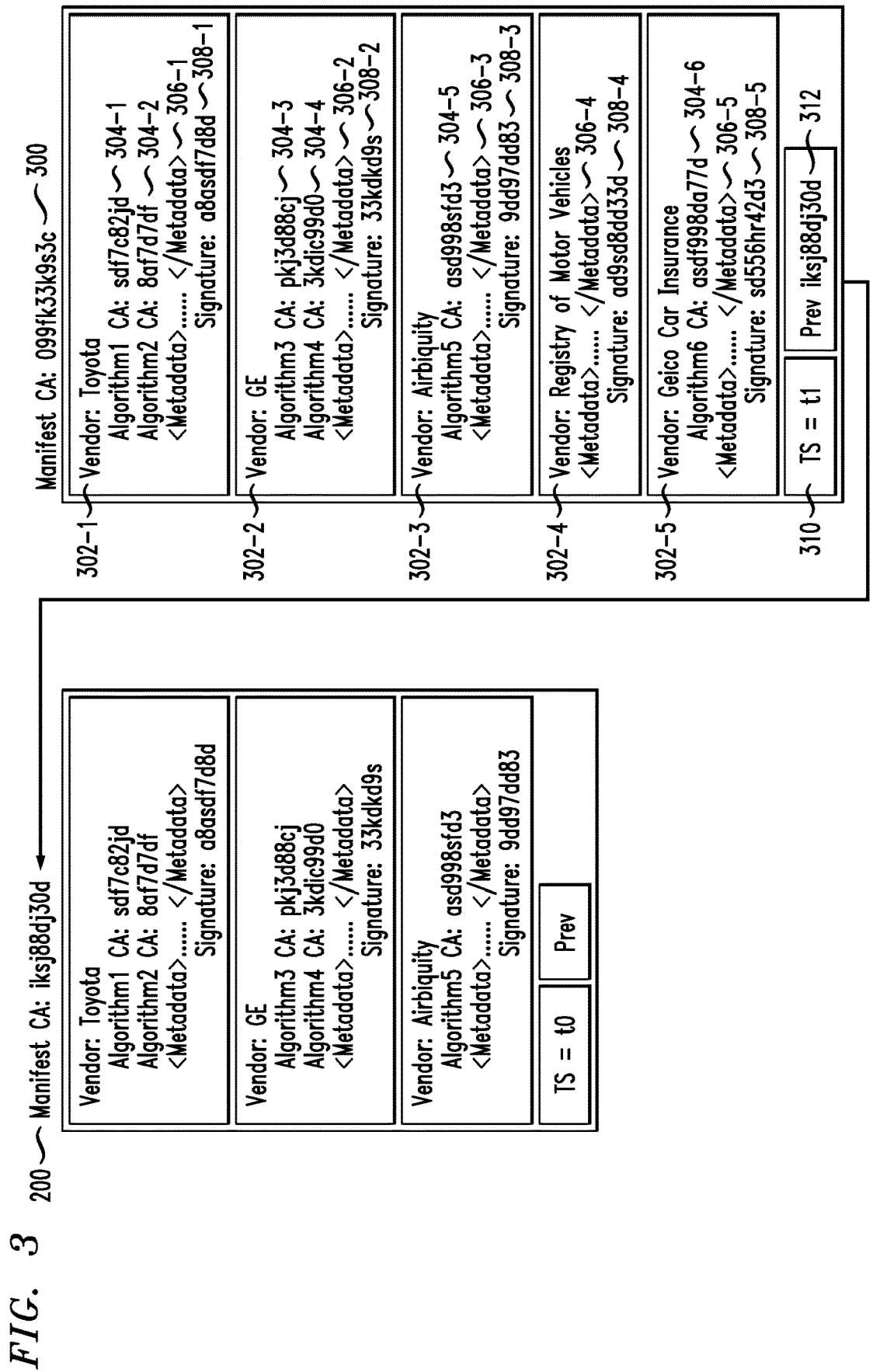
FIG. 3 illustrates a new vendor manifest created after a purchase, according to an illustrative embodiment.

FIG. 3 illustrates a new vendor manifest 300 created after a purchase, according to an embodiment of the invention. Referring to FIG. 3, in a non-limiting illustrative example, once a manufacturing process of an automated system is complete, a manifest can grow as third parties become involved in the lifecycle of the automated system. These third parties may or may not introduce new algorithms into the automated system. The new manifest 300 is generated in response to one or more algorithms being added to the automated system in addition to the original algorithms. As can be seen, the new manifest 300 is derived from the manifest 200 and comprises a combined record of the original and newly added algorithms configured to be used in the operation of the automated system.

Taking the purchase of a vehicle as a non-limiting illustrative example, the purchase associates an identity (e.g., the purchaser) with the original manifest 200 via, for example, a registry of motor vehicles, along with signing up for an insurance carrier (e.g., Geico®). The insurance carrier may contribute a new piece of software to the vehicle that tracks, for example, sensor inputs (e.g., speed, GPS location, braking behavior, etc.) and produces intermittent driver ratings. The introduction of new vendors and new software into the automated system creates a new manifest 300. This new manifest may be stored in any number of ways, including as a blockchain entry, or as immutable chains stored on a content-addressable or object-addressable system. The new manifest 300 adds the Registry of Motor Vehicles and Geico® Car Insurance, 302-4 and 302-5 respectively, to the original vendors 302-1, 302-2 and 302-3, and the CA (hash value) 304-6 for Algorithm6 to the original hash values 304-1, 304-2, 304-3, 304-4 and 304-5 associated with Algorithm1, Algorithm2, Algorithm3, Algorithm4, and Algorithm5. The new manifest also adds metadata 306-4 and 306-5 associated with the new entries to metadata 306-1, 306-2 and 306-3 associated with the original entries, and adds digital signatures 308-4 and 308-5 corresponding to the new vendors 302-4 and 302-5 in addition to original signatures 308-1, 308-2 and 308-3. As can be seen, the original CAs (hash values) 304-1, 304-2, 304-3, 304-4 and 304-5 associated with Algorithm1, Algorithm2, Algorithm3, Algorithm4, and Algorithm5, and the original signatures 308-1, 308-2 and 308-3 are unchanged from the original manifest 200.

This manifest can be timestamped (see FIG. 3, element 310). In this case, the timestamp (TS) is equal to t1 since the manifest 300 is a new manifest based off of original manifest 200 (TS=t0). As can be seen by element 312 in FIG. 3, the manifest 300 refers to the content address of the previous manifest 200.

Figure 4:
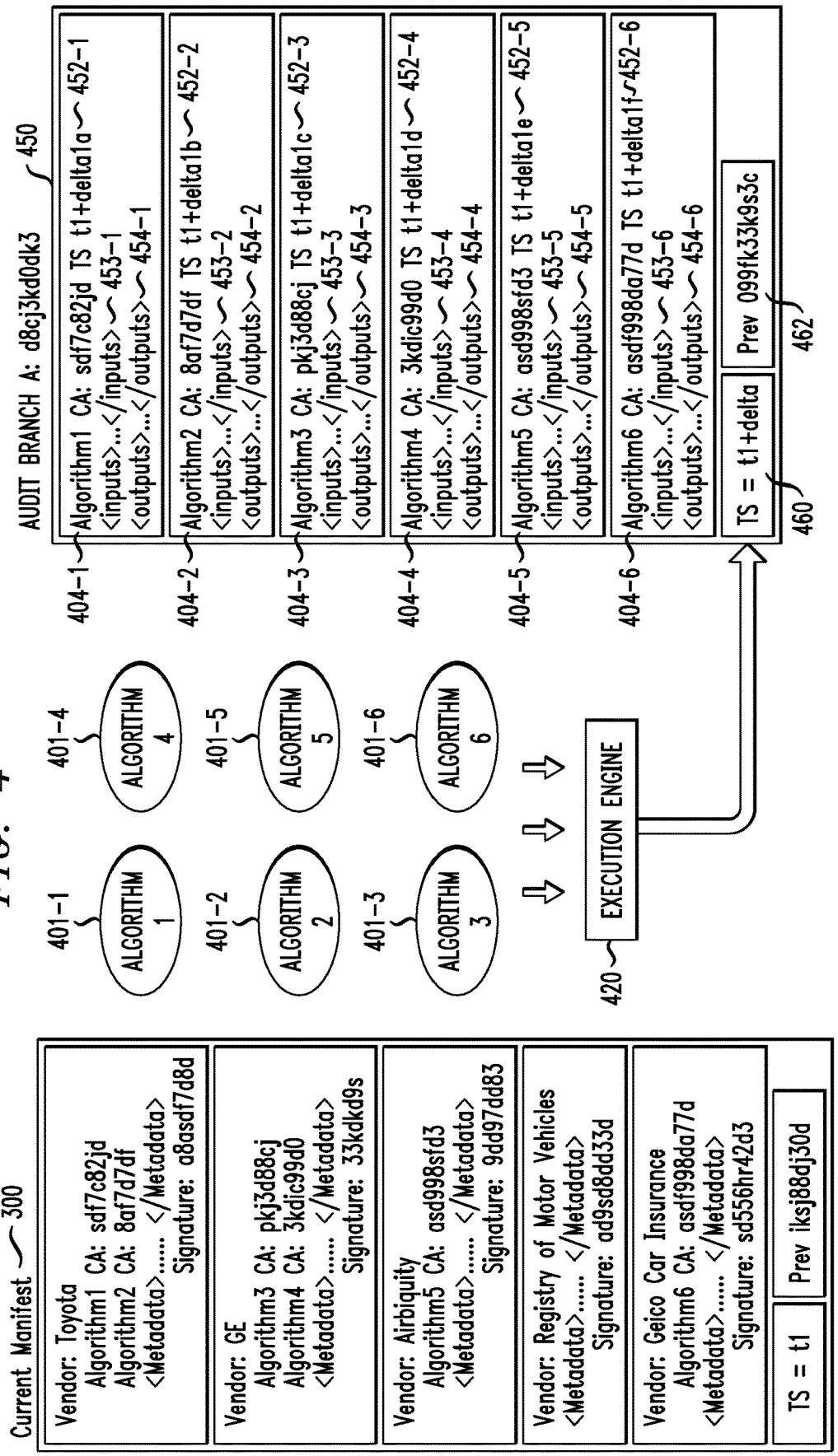
FIG. 4 illustrates generation of an audit branch, according to an illustrative embodiment.

FIG. 4 illustrates generation of an audit branch, according to an embodiment of the invention. Referring to FIG. 4, an operational audit branch 450 is generated from a current manifest 300. Once a manifest is created which fully describes all vendors and algorithms currently involved with the automated system (in this case, manifest 300), an operational audit branch 450 can be created, which, in accordance with an embodiment of the present invention, is an immutable log including inputs 453-1, 453-2, 453-3, 453-4, 453-5 and 453-6 used by one or more of the algorithms 401-1, 401-2, 401-3, 401-4, 401-5 and 401-6, outputs 454-1, 454-2, 454-3, 454-4, 454-5 and 454-6 created by one or more of the algorithms 401-1, 401-2, 401-3, 401-4, 401-5 and 401-6 and a CA (hash value) 404-1, 404-2, 404-3, 404-4, 404-5 and 404-6 of the algorithms 401-1, 401-2, 401-3, 401-4, 401-5 and 401-6.

These immutable logs descend from the current manifest 300. For example, when the manifest changes, a new audit branch is created using a CA of the updated (e.g., changed) current manifest. The operational audit branch 450 is generated from the current manifest 300 in response to execution of the algorithms 401-1, 401-2, 401-3, 401-4, 401-5 and 401-6 by, for example, an execution engine 420 of the automated system. Generation of the operational audit branch 450 comprises recording the inputs 453-1, 453-2, 453-3, 453-4, 453-5 and 453-6 used by the algorithms, and recording the outputs 454-1, 454-2, 454-3, 454-4, 454-5 and 454-6 generated by the algorithms. The outputs may include respective CAs of the corresponding algorithms. According to an embodiment, the algorithms that are executed by the execution engine 420 are previously accounted for, digitally signed algorithms from recorded vendors, and their known CAs are part of the algorithmic output.

Continuing with the illustrative and non-limiting vehicle example, an operator may take a car for a drive after registration and insurance vendors have been added to the manifest. During the course of operation, each algorithm 401-1, 401-2, 401-3, 401-4, 401-5 and 401-6 is executed and a record of the executions is inserted into an audit branch 450 with the input and output results. FIG. 4 shows an audit branch 450 (also referred to as an "audit block") being generated as all algorithms are executed in the context of a particular manifest 300.

This audit branch 450 can be timestamped (see FIG. 4, element 460). In this case the timestamp (TS) is equal to t1+delta since the audit branch 450 is based off of manifest 300, which had a time t1. Delta represents the change in time from t1 for the execution of the algorithms. Each algorithm entry in the audit branch 450 includes a time stamp 452-1, 452-2, 452-3, 452-4, 452-5 and 452-6 represented as "TS t1+delta1(a, b, c, d, e or f)," representing possibly different execution times for each algorithm. As can be seen by element 462 in FIG. 4, the audit branch 450 refers to the CA of the current manifest 300.

Figure 5:
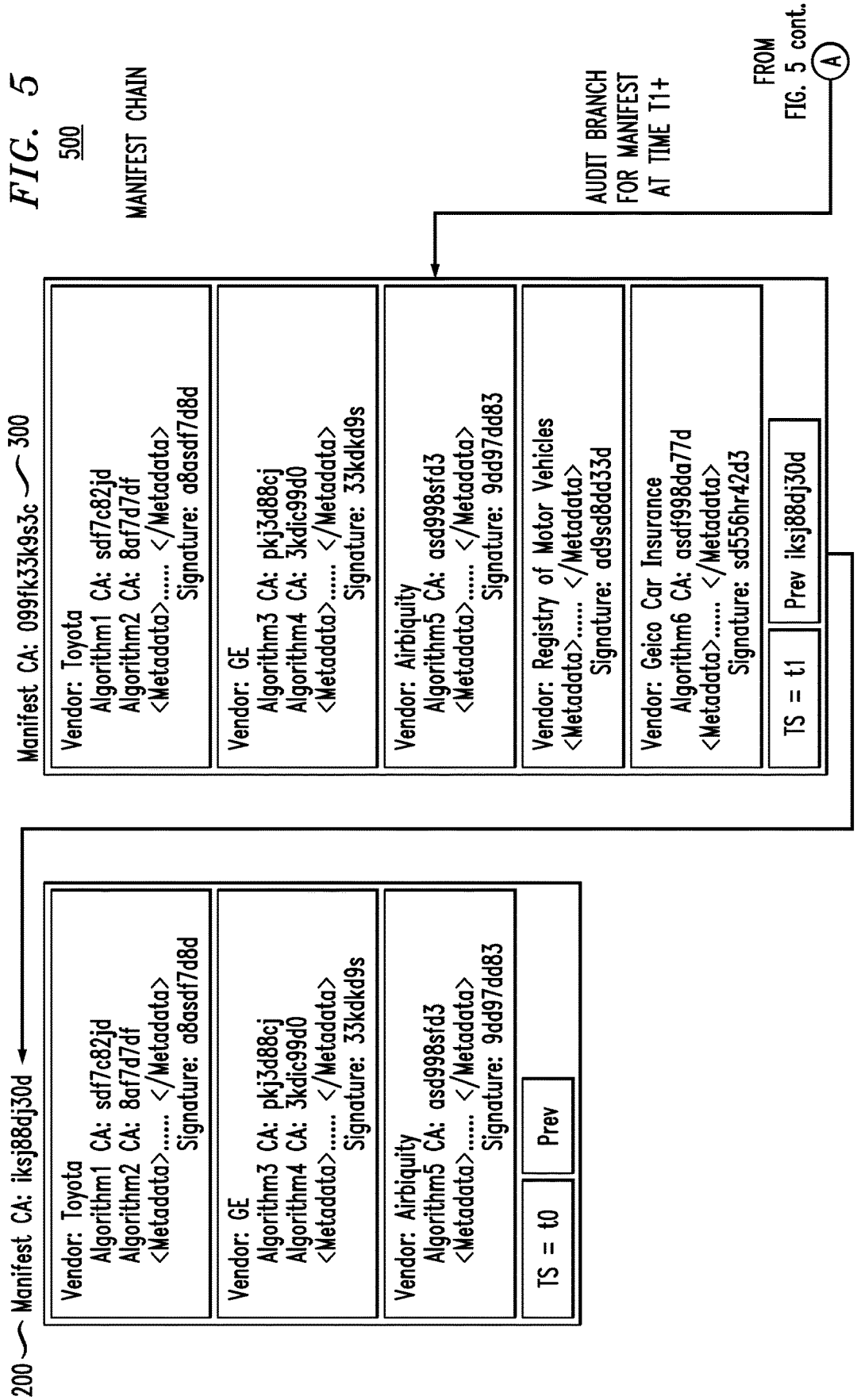
FIG. 5 illustrates generation and linking of an additional audit block, according to an illustrative embodiment.
Figure 5:
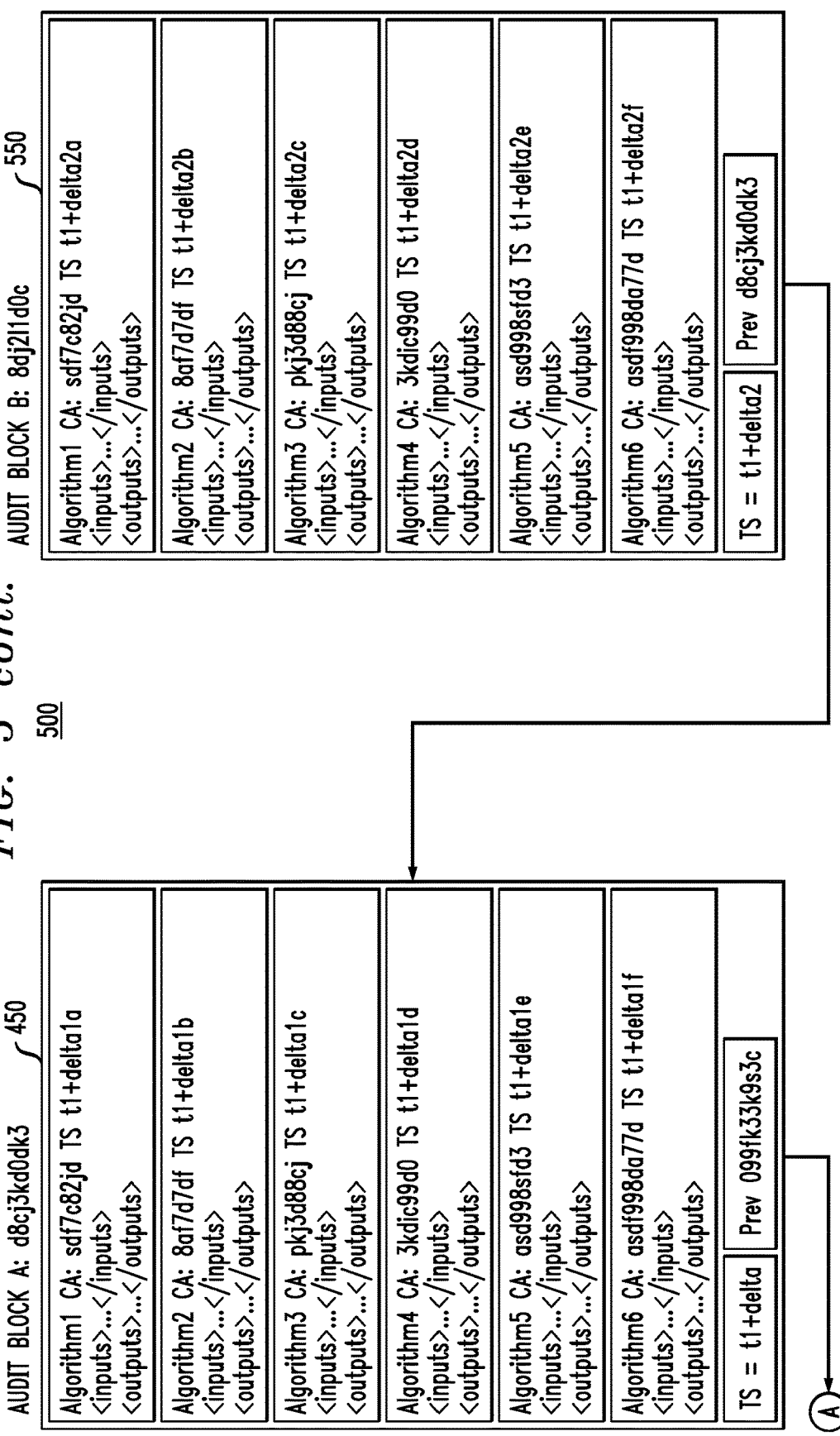

FIG. 5 illustrates generation and linking of an additional audit block 550 in a manifest chain 500, according to an embodiment of the invention. As audit entries are continually generated during operation of the automated system, audit branches 450 and 550 for times t1+delta and t1+delta2, respectively, are linked off of the current manifest 300. For example, time t1+delta2 represents an audit branch for a later point in time of execution of the algorithms 401-1, 401-2, 401-3, 401-4, 401-5 and 401-6 than that for audit block 450.

Over the course of time, maintenance and upgrade procedures may occur that result in modified or new software packages. As explained herein, these maintenance and upgrade procedures result in a new manifest, which may include a new vendor that performed an upgrade (e.g. a mechanic), or specify that an existing vendor (e.g. GE®) automatically upgraded an entry. This results in a new manifest entry on a manifest chain, and a subsequent new audit branch coming from the new manifest entry.

For devices that are Internet (or other network) connected, new manifests and branches can periodically be uploaded to permanent storage. These uploads can go to, for example, one vendor (e.g., an overall vendor of the automated system) or to specific vendors (e.g., vendors for all algorithms currently running in the system). The upload of the full state of manifests and audit branches enables a wide variety of functionality, including analysis of system operation, correctness of input/output for system improvement, and proof-of-operation in the case of lawsuits or other situations where a determination of liability may be necessary. Over the course of time, new entries may be uploaded (e.g., to a cloud service provider). This can be accomplished in any number of ways, including the cloud service provider keeping a bookmark of a last upload, including information such as, which manifest was current and location on a manifest chain.

During an example application, at any particular time (e.g., when the automated system fails), audit branches and manifests or portions thereof, can be queried or uploaded (e.g., by the police arriving at an accident) on-site and/or as part of a black-box analysis. In other applications, a variety of business benefits can result from applications of embodiments of the present invention, including, but not necessarily limited to, an inspection of inputs and outputs for a particular automated decision made at a particular point in time to identify bugs, assigning liability for those bugs to a specific vendor, and making improvements for certain output results to improve automated system accuracy.

Figure 6:
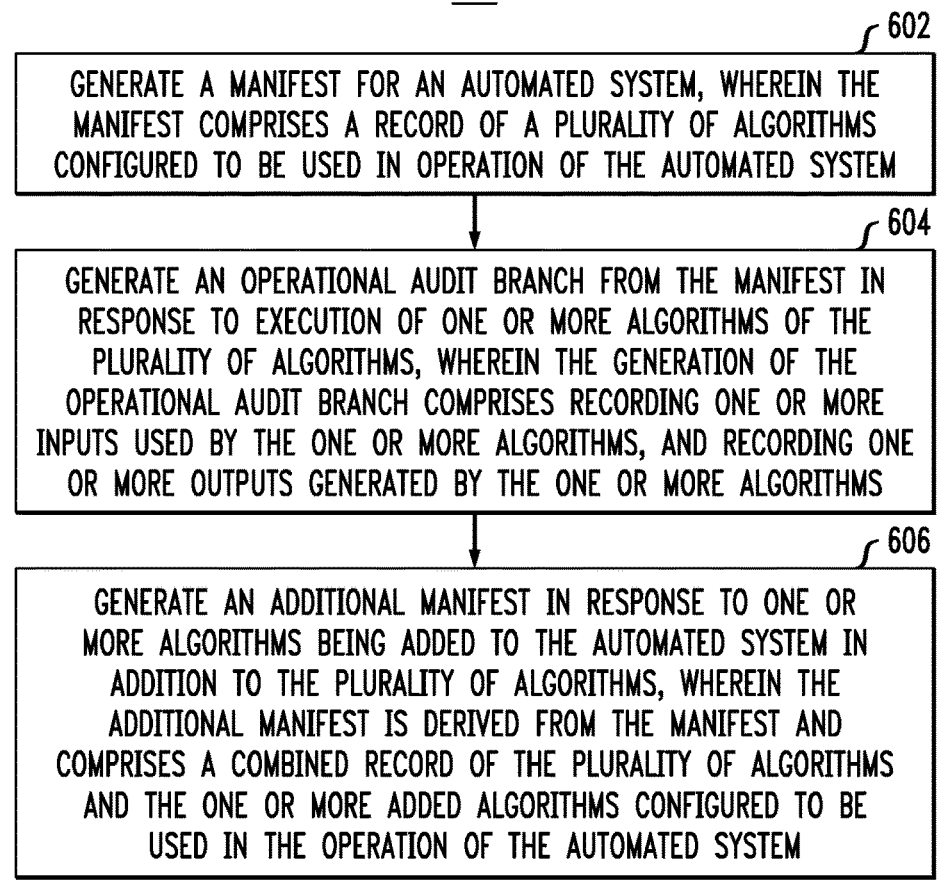
FIG. 6 illustrates a process for creating a tamper-proof log of automated processes, according to an illustrative embodiment.

FIG. 6 illustrates a process 600 for creating a tamper-proof log of automated processes in accordance with an illustrative embodiment. In step 602, a manifest for an automated system is generated. The manifest comprises a record of a plurality of algorithms configured to be used in operation of the automated system. In step 604, an operational audit branch is generated from the manifest in response to execution of one or more algorithms of the plurality of algorithms. The generation of the operational audit branch comprises recording one or more inputs used by the one or more algorithms, and recording one or more outputs generated by the one or more algorithms. In step 606, an additional manifest is generated in response to one or more algorithms being added to the automated system in addition to the plurality of algorithms. The additional manifest is derived from the manifest and comprises a combined record of the plurality of algorithms and the one or more added algorithms configured to be used in the operation of the automated system.

At least portions of the system for the generation of operational logs shown in FIGS. 1-6 may be implemented using one or more processing platforms. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 7.

As is apparent from the above, one or more of the processing modules or other components of the system for the generation of operational logs shown in FIGS. 1-6 may each run on a computer, server, storage device or other processing platform element. A given such element may be viewed as an example of what is more generally referred to herein as a "processing device." An example of such a processing platform is processing platform 700 shown in FIG. 7.

The processing platform 700 in this embodiment comprises a plurality of processing devices, denoted 702-1, 702-2, 702-3, . . . 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 7:
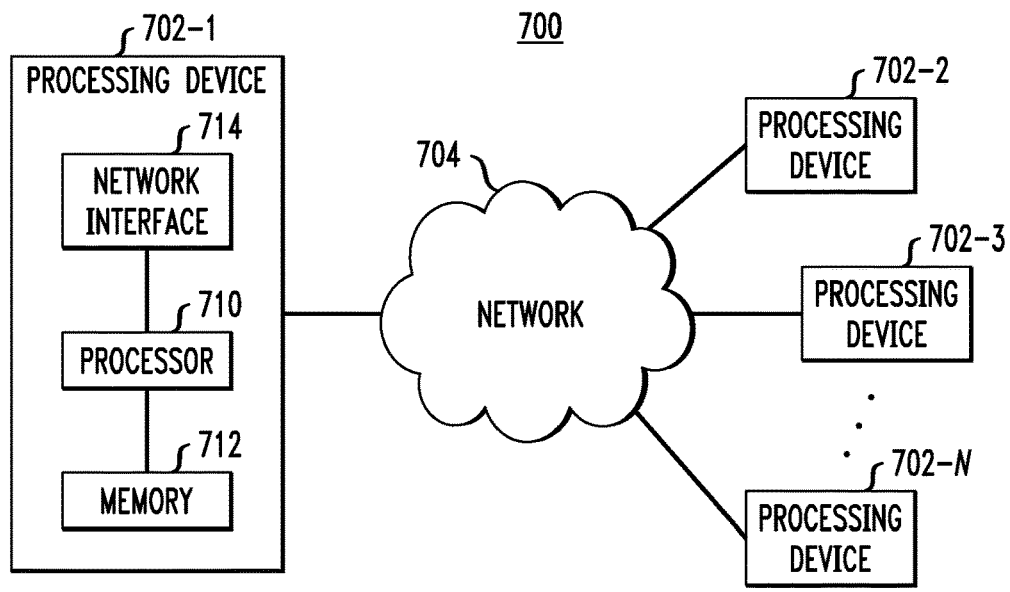
FIG. 7 illustrates a processing platform used to implement a system for the generation of operational logs, according to an illustrative embodiment.

Also included in the processing device 702-1 of the example embodiment of FIG. 7 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for the generation of operational logs, although in other embodiments a given tenant can have multiple containers. The containers may be utilized to implement a variety of different types of functionality within the system for the generation of operational logs. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for the generation of operational logs. Such components can communicate with other elements of the system over any type of network or other communication media.

As indicated previously, in some embodiments, components of the system for the generation of operational logs as disclosed herein can be implemented at least in part in the form of one or more software programs stored in memory and executed by a processor of a processing device. For example, at least portions of the execution environment or other logging system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems for the generation of operational logs. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
    generating a manifest for an automated system, wherein the manifest comprises a record of a plurality of algorithms configured to be used in operation of the automated system;
    wherein the automated system performs automated control of a vehicle;
    generating an operational audit branch from the manifest in response to execution of one or more algorithms of the plurality of algorithms, wherein the execution of the one or more algorithms controls one or more functions of the vehicle;
    timestamping the manifest;
    wherein the generation of the operational audit branch comprises:
        recording one or more inputs used by the one or more algorithms;
        recording one or more outputs generated by the one or more algorithms; and
        generating a plurality of timestamps for execution of each algorithm of the plurality of algorithms, the plurality of timestamps representing one or more changes in time from a timestamp of the manifest;
    wherein the generation of the plurality of timestamps comprises:
        generating at least a first timestamp for execution of a first algorithm of the plurality of algorithms, the first algorithm controlling a first function of the one or more functions of the vehicle, and the first timestamp representing a first change in time from the timestamp of the manifest; and
        generating at least a second timestamp for execution of a second algorithm of the plurality of algorithms, the second algorithm controlling a second function of the one or more functions of the vehicle, and the second timestamp representing a second change in time from the timestamp of the manifest different from the first change; and
    receiving a query of the manifest and of the operational audit branch in response to a failure of at least one of the first function and the second function;
    wherein at least one of the first function and the second function comprises tracking one or more sensor inputs corresponding to operation of the vehicle;
    wherein at least one of the first algorithm and the second algorithm generates ratings for an operator of the vehicle based at least in part on the tracking of the one or more sensor inputs;
    wherein the one or more sensor inputs comprise information corresponding to at least one of speed, global positioning system location and braking of the vehicle; and
    wherein the method is implemented via one or more processing devices each comprising a processor coupled to a memory.

2. The method of claim 1, wherein the operational audit branch further comprises a hash value of each of the one or more algorithms.

3. The method of claim 1, wherein the one or more outputs comprise a content-address of the one or more algorithms.

4. The method of claim 1, wherein the automated system is an embedded system.

5. The method of claim 1, further comprising generating an additional manifest in response to one or more algorithms being added to the automated system in addition to the plurality of algorithms, wherein the additional manifest is derived from the manifest and comprises a combined record of the plurality of algorithms and the one or more added algorithms configured to be used in the operation of the automated system.

6. The method of claim 5, further comprising storing the additional manifest as a blockchain entry.

7. The method of claim 5, further comprising storing the additional manifest as one or more immutable chains on at least one of a content-addressable system and an object addressable system.

8. The method of claim 5, further comprising generating an additional operational audit branch from the additional manifest in response to the execution of the one or more algorithms of the plurality of algorithms, wherein the additional operational audit branch uses a content-address of the additional manifest.

9. The method of claim 5, further comprising:
digitally signing the manifest with a hash value; and
digitally signing the additional manifest with another hash value based at least partially on the hash value of the manifest.

10. The method of claim 1, further comprising encrypting the manifest using a hash function.

11. The method of claim 1, wherein the record comprises a vendor respectively associated with each algorithm of the plurality of algorithms.

12. The method of claim 1, wherein each algorithm of the plurality of algorithms is associated with a corresponding hash value.

13. The method of claim 12, wherein the manifest further comprises a record of the corresponding hash values associated with each algorithm of the plurality of algorithms.

14. The method of claim 1, wherein each algorithm of the plurality of algorithms is digitally signed with a private key.

15. The method of claim 14, wherein the manifest comprises the digital signatures of each algorithm of the plurality of algorithms.

16. The method of claim 1, wherein the manifest indicates whether a vendor of the automated system created one or more algorithms of the plurality of algorithms.

17. The method of claim 1, further comprising: uploading the manifest and the operational audit branch to a memory.

18. A system comprising:
at least one processor, coupled to a memory, and configured to:
generate a manifest for an automated system, wherein the manifest comprises a record of a plurality of algorithms configured to be used in operation of the automated system;
wherein the automated system performs automated control of a vehicle;
generate an operational audit branch from the manifest in response to execution of one or more algorithms of the plurality of algorithms, wherein the execution of the one or more algorithms controls one or more functions of the vehicle;
timestamp the manifest;
wherein in generating the operational audit branch, the at least one processor is further configured to:
record one or more inputs used by the one or more algorithms;
record one or more outputs generated by the one or more algorithms; and
generate a plurality of timestamps for execution of each algorithm of the plurality of algorithms, the plurality of timestamps representing one or more changes in time from a timestamp of the manifest;
wherein in generating the plurality of timestamps, the at least one processor is further configured to:
generate at least a first timestamp for execution of a first algorithm of the plurality of algorithms, the first algorithm controlling a first function of the one or more functions of the vehicle, and the first timestamp representing a first change in time from the timestamp of the manifest; and
generate at least a second timestamp for execution of a second algorithm of the plurality of algorithms, the second algorithm controlling a second function of the one or more functions of the vehicle, and the second timestamp representing a second change in time from the timestamp of the manifest different from the first change; and
receive a query of the manifest and of the operational audit branch in response to a failure of at least one of the first function and the second function;
wherein at least one of the first function and the second function comprises tracking one or more sensor inputs corresponding to operation of the vehicle;
wherein at least one of the first algorithm and the second algorithm generates ratings for an operator of the vehicle based at least in part on the tracking of the one or more sensor inputs; and
wherein the one or more sensor inputs comprise information corresponding to at least one of speed, global positioning system location and braking of the vehicle.

19. A computer program product comprising a non-transitory processor-readable storage medium having stored therein program code of one or more software programs, wherein the program code when executed by at least one processing device causes said at least one processing device to:
generate a manifest for an automated system, wherein the manifest comprises a record of a plurality of algorithms configured to be used in operation of the automated system;
wherein the automated system performs automated control of a vehicle;
generate an operational audit branch from the manifest in response to execution of one or more algorithms of the plurality of algorithms, wherein the execution of the one or more algorithms controls one or more functions of the vehicle;
timestamp the manifest;
wherein the generation of the operational audit branch comprises:
recording one or more inputs used by the one or more algorithms;
recording one or more outputs generated by the one or more algorithms; and
generating a plurality of timestamps for execution of each algorithm of the plurality of algorithms, the plurality of timestamps representing one or more changes in time from a timestamp of the manifest;
wherein the generation of the plurality of timestamps comprises:
generating at least a first timestamp for execution of a first algorithm of the plurality of algorithms, the first algorithm controlling a first function of the one or more functions of the vehicle, and the first timestamp representing a first change in time from the timestamp of the manifest; and generating at least a second timestamp for execution of a second algorithm of the plurality of algorithms, the second algorithm controlling a second function of the one or more functions of the vehicle, and the second timestamp representing a second change in time from the timestamp of the manifest different from the first change; and receive a query of the manifest and of the operational audit branch in response to a failure of at least one of the first function and the second function;

wherein at least one of the first function and the second function comprises tracking one or more sensor inputs corresponding to operation of the vehicle;

wherein at least one of the first algorithm and the second algorithm generates ratings for an operator of the vehicle based at least in part on the tracking of the one or more sensor inputs; and wherein the one or more sensor inputs comprise information corresponding to at least one of speed, global positioning system location and braking of the vehicle.

\* \* \* \* \*